(No Model.)
W. A. GRÖNDAHL.
SELF ADJUSTING PULLEY.
No. 299,470.  Patented May 27, 1884.
Fig. 1.
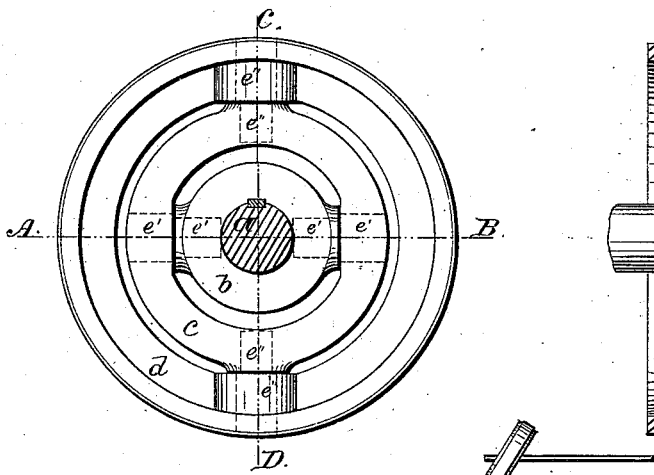
Fig. 2.
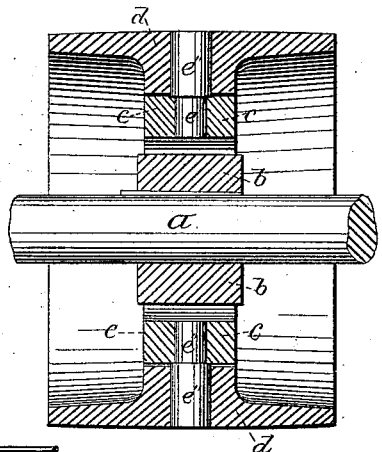
Fig. 3.
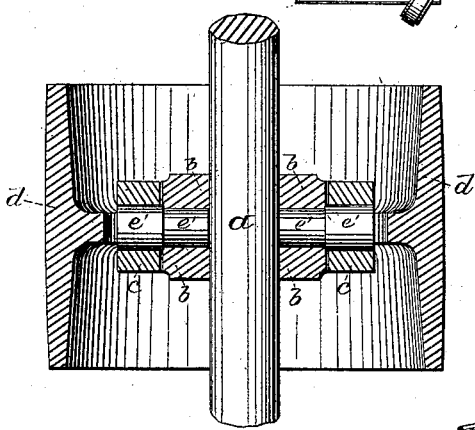
Fig. 6.
Fig. 4.
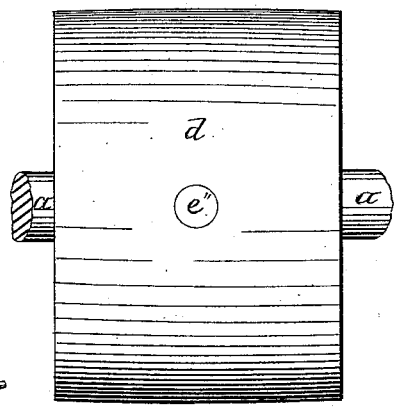
Fig. 5.
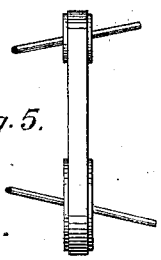
Witnesses:
J. B. Thompson
C. W. White
Inventor
Wilhelm A. Gröndahl
per A. S. Curry
Attorney

UNITED STATES PATENT OFFICE.

WILHELM A. GRÖNDAHL, OF PORTLAND, OREGON.

SELF-ADJUSTING PULLEY.

SPECIFICATION forming part of Letters Patent No. 299,470, dated May 27, 1884.

Application filed November 24, 1883. (No model.)

*To all whom it may concern:*

Be it known that I, W. A. GRÖNDAHL, a subject of the King of Norway, residing at Portland, in the county of Multnomah and State of Oregon, have invented a new and useful Self-Adjusting Pulley, of which the following is a specification.

My invention consists of a self-adjusting pulley, by which I claim, first, to be able to transmit power, either by belt, chain, or rope, between axles in angular position and in the same plane, Figure 5; second, to be able to transmit power by the same above-named mediums between shafts in angular position and in different planes; third, to be able to transmit power between parallel axles when the pulleys are not placed in the same right-angular position to the shafts, Fig. 6; fourth, to be able to transmit power between shafts changing their relative position while working—for example, between truck and driving wheels of locomotives, which above claims cannot be made for any ordinary pulley; and, fifth, to be able to transmit power between shafts where ordinary pulleys can be used. I attain these objects by the mechanism illustrated in the accompanying drawings, in which—

Fig. 1 represents an end elevation of the self-adjusting pulley. Fig. 2 represents a vertical section through the center line C D of the pulley; Fig. 3, a horizontal section through the center line A B; Fig. 4, a front elevation of the pulley. Figs. 5 and 6 represent the pulleys on driving-shafts operated by belt.

Similar letters refer to similar parts throughout the several views.

*a* represents the shaft to which the ring or hub *b* is keyed. *c* is an intermediate ring, which is fastened to *b* by the two taps or spokes *e' e'*, which taps are fastened, either by keys, pins, or other suitable mechanism, to the ring *c* and allowed to swing in the hub *b*. *d* is in ordinary cases the pulley, and is fastened to the intermediate ring, *c*, by the two spokes or taps *e" e"*. These taps are fastened to *d* in a similar way as the taps *e' e'* were to *c*, and *d* allowed to swing on the taps *e" e"*. It is evident that I obtain by this construction, which allows the pulley first to swing on the taps *e' e'* and thence on the taps *e" e"*, these having a right-angular position to each other, the adjustment of the pulley to the direction of the draft or adjustment to any position of the shaft, Figs. 5 and 6.

I have stated that in ordinary cases *d* is the sheave or pulley. In cases of large pulleys or sheaves, the pulley spokes or arms are fastened to *d*, thus making *d* the hub of the pulley. I can use this self-adjusting pulley to transmit power between shafts in angular positions to each other, which is impossible by any other pulleys without addition of extra guide-pulleys, and it can be used either for belts, ropes, chains, or other similar transmissions, and on these bases I claim that it will be very useful for shops and factories when the arrangement of the machines has mostly been guided by the necessity of having parallel axles and shafts, while it, by the introduction of the self-adjusting pulley, will be guided by the convenience only. It also serves as a power-connection between changeable axles—axles being in one instance parallel, in the other diverging—for example, in connecting the axles of the driving-wheels of a locomotive by the axles of the truck and the tender. By this the active adhesion of the locomotive can be increased to its entire weight. Thus the entire weight enters into the calculations of the capacity to draw loads, instead of the part of the weight resting on the driving-wheels.

An ordinary American locomotive-engine weighing one hundred thousand pounds, with forty thousand pounds on the driving-wheels, has a capacity of one thousand one hundred and sixty tons on level track, while if the total weight of the locomotive and tender were carried on driving-wheels, or, which is the same, the truck-wheels and tender-wheels made drivers by the means of the self-adjusting pulley and suitable transmission, the capacity of the locomotive on level track would be two thousand nine hundred tons, thus giving an increased capacity of one thousand seven hundred and forty tons, and at the same time the power-connection by the self-adjusting pulley would leave the locomotive the same freeness in adjusting itself to the curves of the track.

What I claim as my invention, and for which I desire Letters Patent, is—

A pulley having a hub, $b$, with an intermediate ring, $c$, fastened to $b$ by taps or spokes $e'\ e'$, which are fastened to the ring $c$ by keys or pins or other suitable mechanism, and allowed to swing in the hub $b$, the taps or spokes $e''\ e''$ fastened to $d$ in a similar way as $e'\ e'$ to $c$, and $d$ allowed to swing on taps or spokes $e''\ e''$, all substantially as set forth, and for the purposes specified.

In testimony whereof I affix my signature in presence of two witnesses.

WILHELM A. GRÖNDAHL.

Witnesses:
R. B. CURRY,
R. M. DEMENT.